United States Patent
Hayes, Jr. et al.

[11] Patent Number: 6,005,249
[45] Date of Patent: Dec. 21, 1999

[54] COSINE CORRECTED OPTICAL PATHWAY OF A SPECTRAL RADIOMETER

[75] Inventors: Douglass R. Hayes, Jr., Falls Church, Va.; Vernon R. Goodrich, Germantown, Md.; William R. Brinley, Jr., Fulton, Md.; Patrick J. Neale, Edgewater, Md.

[73] Assignee: Smithsonian Environmental Research Center, Edgewater, Md.

[21] Appl. No.: 09/040,441

[22] Filed: Mar. 18, 1998

Related U.S. Application Data

[60] Provisional application No. 60/039,339, Mar. 18, 1997.

[51] Int. Cl.$^6$ ....................................................... G01J 5/08
[52] U.S. Cl. ................................................................. 250/372
[58] Field of Search ................................................. 250/372

[56] References Cited

U.S. PATENT DOCUMENTS

| | | | |
|---|---|---|---|
| 2,836,098 | 5/1958 | Stimson et al. . | |
| 3,787,703 | 1/1974 | Topol . | |
| 3,796,887 | 3/1974 | Vincent et al. | 250/565 |
| 3,838,282 | 9/1974 | Harris . | |
| 3,880,528 | 4/1975 | Petersen et al. . | |
| 4,076,424 | 2/1978 | Ida . | |
| 4,086,489 | 4/1978 | Piltingsrud | 250/372 |
| 4,125,828 | 11/1978 | Resnick et al. . | |
| 4,192,995 | 3/1980 | Anthon . | |
| 4,264,211 | 4/1981 | Biggs . | |
| 4,294,931 | 10/1981 | Levin et al. . | |
| 4,348,664 | 9/1982 | Boschetti et al. . | |
| 4,362,931 | 12/1982 | Maruko et al. . | |
| 4,482,251 | 11/1984 | Saylor . | |
| 4,505,583 | 3/1985 | Konomi . | |
| 4,535,244 | 8/1985 | Burnham . | |
| 4,648,714 | 3/1987 | Benner et al. . | |
| 4,652,761 | 3/1987 | Kerr et al. . | |
| 4,737,029 | 4/1988 | Yabusaki et al. . | |
| 4,772,124 | 9/1988 | Wooten et al. . | |
| 4,825,078 | 4/1989 | Huber et al. | 250/372 |
| 4,867,563 | 9/1989 | Wurm et al. . | |
| 4,915,500 | 4/1990 | Selkowitz . | |
| 4,945,250 | 7/1990 | Bowen et al. . | |
| 5,391,883 | 2/1995 | Kinsey et al. . | |
| 5,497,004 | 3/1996 | Rudolph et al. | 250/372 |
| 5,514,871 | 5/1996 | Hayes et al. . | |

OTHER PUBLICATIONS

Raywond C. Smith, Richard L. Ensminger, Roswell W. Austin, J. D. Bailey, and G. D. Edwards, "Ultraviolet submersible spectroradiometer." *SPIE Proc. Soc. Photo–Opt. Instrum. Eng. (USA)* Vo. 208 Ocean Optics VI pp. 127–140, 1979.

*Primary Examiner*—Constantine Hannaher
*Attorney, Agent, or Firm*—Wenderoth, Lind & Ponack, L.L.P.

[57] ABSTRACT

An optical pathway of a scanning spectral radiometer for a continuous monitoring of spectral radiation employs a diffuser having an upper source directed surface and a lower sensor directed surface for diffusing radiation incident on the upper surface and transmitting the diffused radiation. An occulting ring laterally surrounds the diffuser. A filter receives the diffused radiation from the light diffuser and passes a predetermined wavelength range. A photodetector is positioned to receive the filtered radiation. The photodetector is positioned at one end of an optical path, with a diffuser being positioned at the other end of the optical path. A collimator is provided between the diffuser and the photodetector, with the optical path extending through the collimator.

18 Claims, 9 Drawing Sheets

System Diagram: Scanning Spectral Radiometer     Figure 1

Optics Path
Figure 2
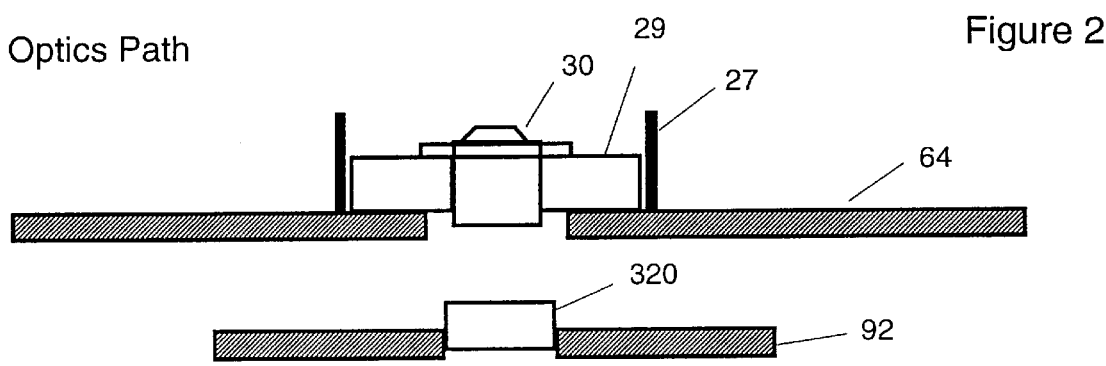
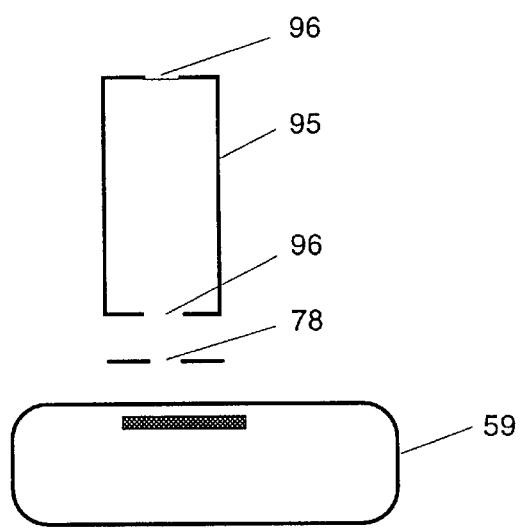

Cosine Corrected Diffuser

Section AA

Occulting Ring for Diffuser

Diffuser Holder

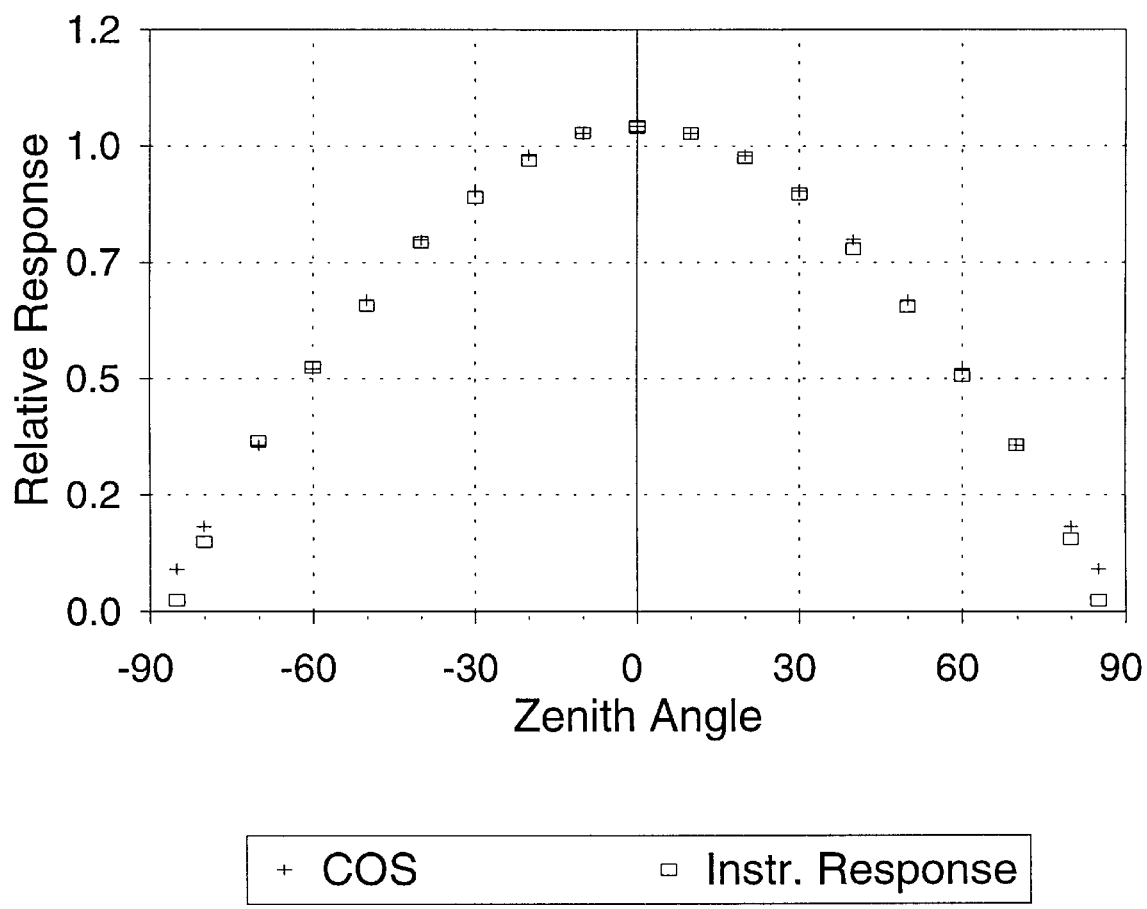

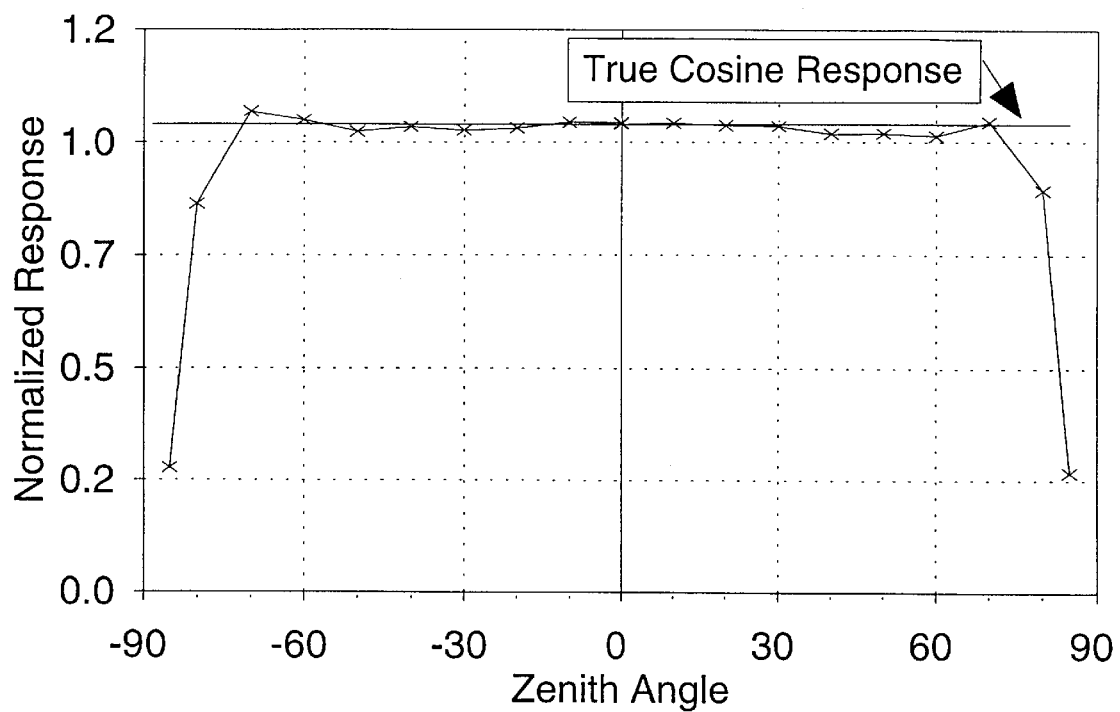

COSINE CORRECTED OPTICAL PATHWAY OF A SPECTRAL RADIOMETER

This is a utility application claiming priority under 35 U.S.C. 119(e) on provisional application Ser. No. 60/039,339, filed Mar. 18, 1997.

BACKGROUND OF THE INVENTION

1. Field of the Invention

The present invention is directed to a spectral scanning radiometer which can detect the presence of and the intensity variations of radiant energy in specific wave bands, such as the visible, near infrared, and ultraviolet wave bands. More particularly, the present invention is directed to an optical pathway of radiant energy in a computerized spectral scanning radiometer.

2. Discussion of the Background

In the environment, solar light plays a key role in seasonal control of growth and development of plants which are harvested for food and medicinal products. In fact, all biological systems in one way or another are dependent upon light for survival. In recent years, environmental concern has focused on the amount of ultraviolet radiation (UV) passing through the Earth's atmosphere due to shifts in the thickness of the protective ozone layer. UV measurements are routinely taken at various places to determine the "sunburn index" at that location to offer warnings to the general public. In industry, the measurement of UV radiation is used for wide ranging applications from the production of chemical fluorocarbons, to aiding the growth of plants in natural and artificial environments, to the production of natural products, and from bioreactors to the testing of light effects on materials such as paints, coatings, building materials, etc.

A thorough understanding of the effects of irradiance, and particularly UV irradiance, and the role it plays in environmental, agricultural and industrial processes is vitally important. In plants, for example, specific photo processes are initiated by the absorption of radiant energy in specific wavebands of UV, visible and near visible IR spectrum. In order to understand the effects that minute differences in the wavebands of radiant energy may have on these processes, it is important to accurately quantitate the irradiance spectrum in the field and in the laboratory.

Measurements of the energy of the sun (solar radiation) reaching the surface of the earth have been undertaken for more than 100 years using a number of techniques and instrument designs. One observation method utilizes an instrument design which "sees" not only the direct beam of light from the sun, but also all solar radiation scattered toward the earth by the earth's atmosphere as well. The usual method of measuring this "sun and sky" radiation was by an instrument whose collector was a metallic flat plate mounted in a horizontal position, and coated with a solar energy absorbing compound. As the plate heated from the absorbed solar radiation, the temperature increase could be measured and quantified. With a calibrated instrument of this type, quite accurate measurements of solar energy could be obtained.

The energy absorbed by a horizontal flat plate collector decreases as the angle of the energy source moves away from the zenith (directly overhead) even though the distance from the source to the collector remains constant. This change in absorbed energy is proportional to the cosine of the angle of the source to the detector's zenith (zenith angle). This effect is referred to as the cosine response of the instrument. A very great number of readings have been made and published using a wide variety of flat plate type collectors.

Developments in instrument design utilizing different detectors and using filters to narrow the regions of the solar spectrum detected by the instrument require that those components be mounted inside the instrument case. Because of the long history of the use of flat plate collectors, there is a need for instruments of other designs to mimic the flat plate collector cosine response to the angle of incident light.

Since the early 1970's the Smithsonian Institution has been developing spectral radiometers designed to monitor solar radiation in narrow spectral bands. These instruments use detectors and filters mounted well inside the instrument. This configuration required the design of a light entrance port window which could mimic the cosine response of a flat plate detector. The port design has to address two problems, because of which problems a transparent flat plate is an unsuitable window. The first problem is that detectors such as photomultiplier tubes (PMTs) have a small active surface which is sensitive and light arising from varying points will have different "views" of the detector. This positional dependence needs to be removed. Second, because of the position of the detector deep within the instrument, rays at high zenith angles will not reach the detector. Characteristic of the first problem is quadrant dependent response, and characteristic of the second problem is failure of cosine response at high zenith angles of incident light. These two technical problems have been addressed in the past by (1) using a diffusing material which will randomize light propagation removing the position (or quadrant) dependency, and (2) introducing an elevated contour on the diffuser surface to more efficiently capture light at high zenith angles.

The optical properties of this window material and the diffuser shape are critical for proper duplication of a correct instrument cosine response, particularly in the UVB range. The material must be able to diffuse the light falling upon it as well as transmit the wavelengths of light desired to be measured. The material needs to diffuse the light falling on it, such that light incident from any angle would be diffused through the window in a direction toward the instrument filters and detector. The material must also be able to transmit the wavelengths of light which are desired to be measured.

The shape of the diffuser is also critical for proper cosine response. This is particularly important with respect to obtaining a proper cosine response for UVB radiation. UVB light will come in from all angles, as it is widely scattered. Optical properties of filters in an optical path also require collimation of the light passing through the window in order to understand the instrument spectral response.

SUMMARY OF THE INVENTION

Accordingly, a primary object of the present invention is to provide a cosine corrected radiometer which can detect irradiance at various wavelengths efficiently and accurately arriving from various angles.

A further object of the present invention is to provide a radiometer capable of detecting solar radiation or artificial irradiance in ultraviolet, visible, or infrared regions of the solar spectrum, or in various combinations of these bands.

The above and further objects according to the present invention are achieved by the provision of a cosine corrected radiometer that includes a diffuser having upper and lower shaped surfaces, an occulting ring that laterally surrounds the diffuser, a light filter below the diffuser, and a photodetector positioned below the filter so as to receive filtered radiation. An optical path thus extends from the diffuser to the photodetector. The filter is positioned along the optical path between the photodetector and the diffuser such that light received by the diffuser passes through the filter. A collimating arrangement is provided between the diffuser and the photodetector. The optical path extends through the collimating arrangement.

The collimating arrangement preferably comprises a collimator tube. The filter preferably comprises a filter wheel having a plurality of band pass filters therein. The filter wheel is mounted for rotation such that upon rotation thereof, the plurality of band pass filters pass through the optical paths so as to scan a predetermined spectrum. A plurality of band pass filters are preferably chosen such that the spectrum comprises UVB light.

With the filter as a band pass filter, the diffuser, an occulting ring and collimating arrangement are arranged along the optical paths so as to provide an instrument cosine response that is within three percent of true cosine response for a zenith angle range of −70° to +70°. Further, the response is within 20% of true cosine response for a zenith angle range of −80° to +80°.

The upper shaped surface of the diffuser comprises an outer annular surface portion, an inner surface portion, and an annular bevel surface extending radially inwardly and axially upwardly from an inner circumference of the outer annular surface portion to the inner surface portion. The lower shaped surface comprises an outer annular portion and an inner recess portion defining a recess that extends axial upwardly relative to the outer annular portion. The inner surface portion has a diameter that is less than half of the diameter of the diffuser as a whole, and the recess has a diameter that is one half of the diameter of the diffuser as a whole, and an axial extent less than half of the axial extent of the diffuser as a whole.

The bevel surface extends at an angle of 27.5° relative to the outer annular surface.

The occulting ring extends upwardly in a direction of the optical path beyond the upper incidence surface of the diffuser. The occulting ring comprises a black annular wall member having an inner diameter twice that of the diffuser.

The collimator tube preferably comprises three apertures. Two first apertures are spaced from each other and have the same nominal aperture diameter. A second aperture has a smaller nominal aperture diameter than the two first apertures, wherein the second aperture is located between the first apertures and the photo detector along the optical path. The photo detector preferably comprises a photomultiplier tube. The photomultiplier tube comprises a photocathode having an active area and a magnetic shield thereon forming a slit over the active area. The slit is positioned along the optical path.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 2 is a schematic illustration partly in section of an optical pathway of the cosine corrected radiometer according to the present invention;

FIG. 4b is a cross-sectional view of the diffuser taken along section line AA of FIG. 4a;

FIG. 5b is a side view of the occulting ring of FIG. 5a;

FIG. 6b is a top view of the diffuser holder of FIG. 6a;

FIG. 8 is a graph showing a relationship of the cosine of the zenith angle of light from a point source such as the sun following in a horizontal surface detector and the response of a cosine corrected spectral radiometer in accordance with the present invention; and FIG. 9 is a graph showing a plot of measured relative of the spectral radiometer in accordance with the present invention normalized with respect to a "true" cosine response (set to 1.0 in this plot).

DETAILED DESCRIPTION OF THE PREFERRED EMBODIMENT

Figure 1:
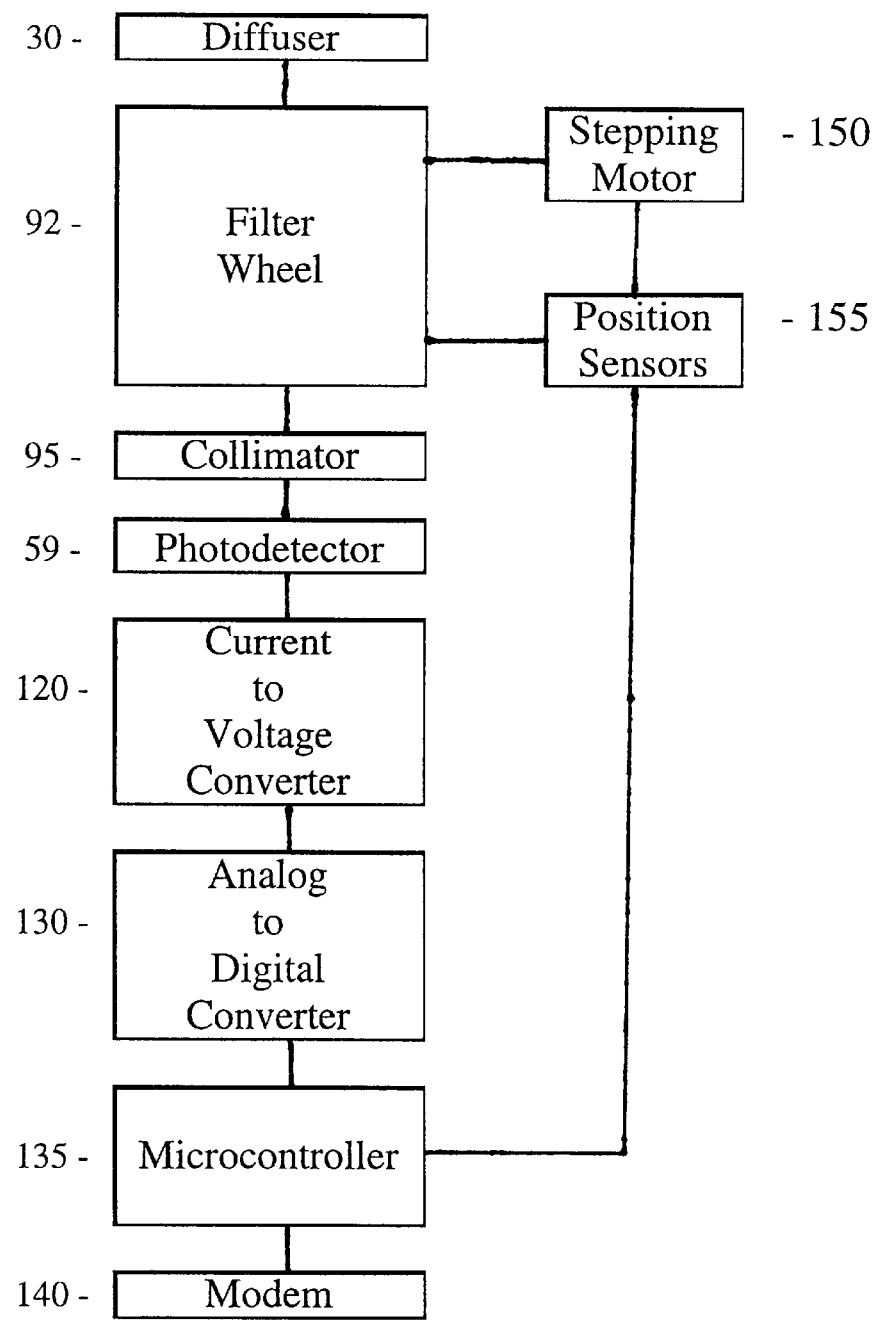
FIG. 1 is a system diagram of a cosine corrected radiometer according to the present invention.

Referring now to the drawings, wherein like reference numerals designate identical or corresponding parts throughout the several views, and more particularly to FIG. 1 thereof, there is shown a cosine corrected spectral radiometer according to the present invention, and in this case configured to measure UVB light.

As shown in FIG. 1, the present invention features a diffuser 30 for receiving incoming radiation or light. The diffuser 30 is part of a cosine corrected optical path for UV wavelengths when UV light is to be detected. That is, the device of the present invention is designed to measure light incident from all angles in a hemisphere beyond the diffuser 30. In the past, many spectral radiometers which measured light were "flat plate collectors", i.e., they comprised a flat surface coated with a light absorbing material. The geometry of incident light falling on this type of detector caused an instrument response which followed the cosine of the zenith angle (directly above the detector) of the incident light.

The device of the present invention, on the other hand, utilizes a cosine corrected optical pathway, including the diffuser 30, so that its output follows the cosine of the zenith angle of incident radiation. A suitable material for the diffuser 30 is TFE; high purity Teflon™ is one example of this kind of material. It can be worked easily, is rigid and passes ultraviolet light.

Figure 3:
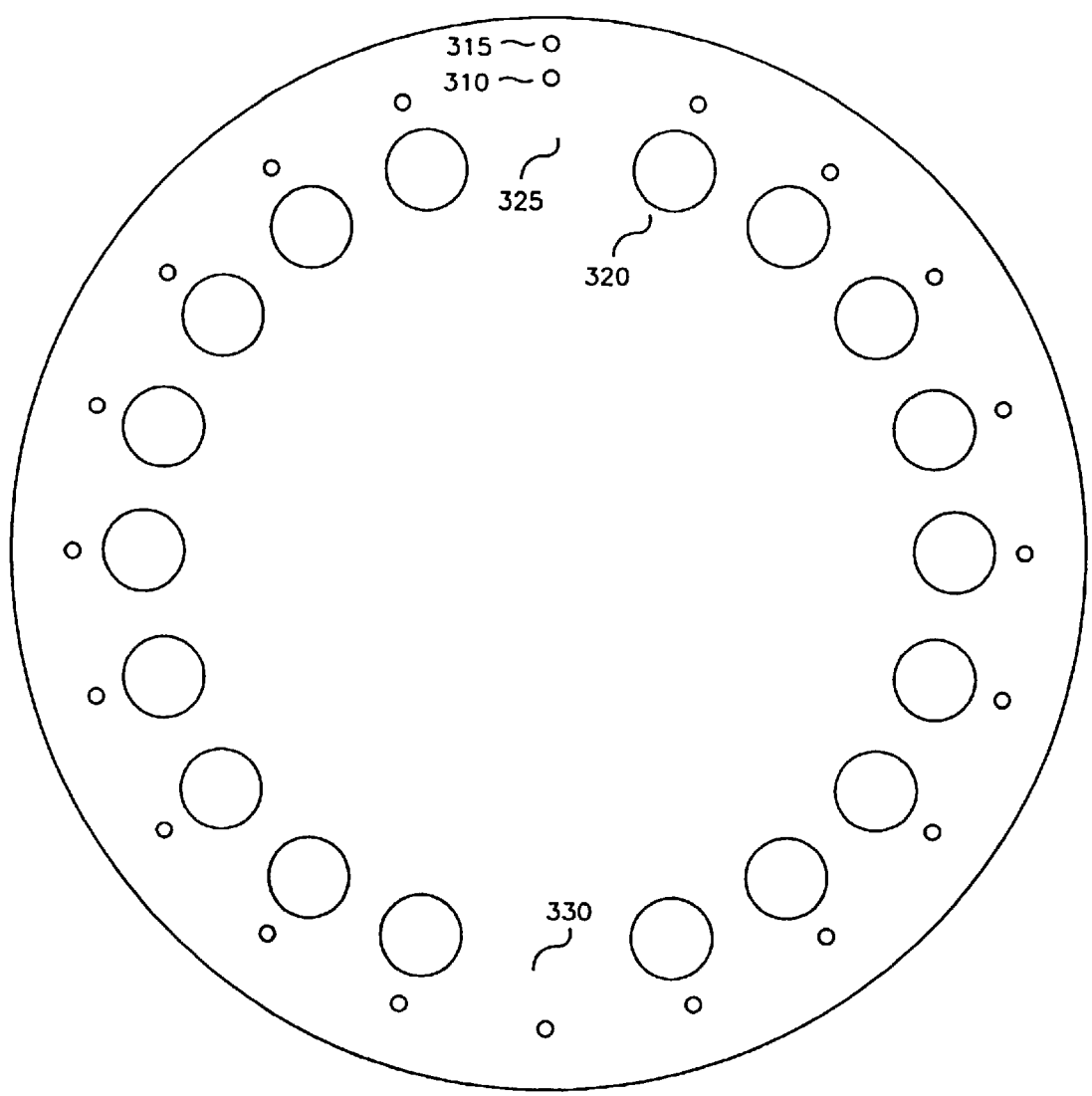
FIG. 3 is an illustration of a filter wheel that can be used together with a cosine corrected spectral radiometer according to the present invention.

A filter is provided along the optical pathway after the diffuser. In this embodiment, it is demonstrated by a filter wheel 92. A wavelength specific band pass filter is employed, in the case of UVB, to provide the narrow band for UVB radiation. Filter wheel 92 as shown in FIG. 3 is composed of a wheel having twenty positioning holes 310 and one index hole 315 located around the periphery of the outermost portion of a platter. Eighteen of the twenty positioning holes 310 corresponding to individual filters 320 that operate at predetermined wavelengths. Two areas corresponding to positions 325 and 330 do not contain filters and are dark positions. That is, they will not transmit any light, and are utilized as references for the light that is transmitted. A stepping motor 150 is provided to control the spinning motion of the filter wheel 92.

Thus, each of the 18 filters that are located at 18 of the 20 positioning holes 310 will operate as band pass filters. Each of these filters will have a different band pass for letting radiant light of different wavelengths pass therethrough. Suitable filters may be known band pass type light interference filters which discriminate individual bands of light.

It should be noted that the filter wheel does not have to be a wheel as described above, but could be a single filter in a non-scanning arrangement. It should also be noted that the filter does not have to occupy the position as shown in FIG. 1 relative to the other components of the spectral radiometer, but could occupy a different position along the optical pathway. This will be discussed in further detail below.

After passing through the filter 92 wheel, light passes through a collimator 95 to a photodetector 59.

The collimator 95 is provided along the optical path. Thus, after light has been received by the diffuser 30 and passes through the filter wheel 92, it passes through the collimator 95, and reaches a photodetector 59. The collimator 95 operates to collimate the radiation passing through the filter 92 to impinge on the photodetector 59. Because of the radiation being collimated, light rays that are normal to the filter surface impinge on the photodetector 59.

The collimator could comprise a series of lenses. However, as will be discussed in more detail below, it preferably comprises a plurality of apertures. The collimator 95 should be machined and coated to reduce internal reflections so as to minimize any spurious signals that may impinge on the photodetector 59.

The photodetector 59 operates to detect light impinging thereon, and converts the light detected into an electrical current signal. The variation of light intensity striking the photodetector will produce a signal of a proportional electric current, i.e., the more intense the light detected, the greater the magnitude of the current signal output by the photodetector 59. There are several types of photodetectors which can be utilized in the device of the present invention. One type of photodetector for UVB measurements is a solar blind photomultiplier tube. An example of a suitable solar blind photomultiplier tube for UVB measurements is a R1657 manufactured by Hamamatsu Corporation.

The electrical signal output by the photodetector 59 is then applied to a current-to-voltage converter 120. Current-to-voltage converter 120 operates to take the current signal output by photodetector 59 and convert it into a voltage signal proportional to the current signal input into current-to-voltage converter 120. Current-to-voltage converter 120 may also be constructed to have a programmable gain stage, which can be controlled by microcontroller 135.

The signal output is then applied to an integrating A/D converter. An example of a suitable A/D converter is an ADC 150CA manufactured by the Thaler Corporation.

The signal output from the A/D converter 130 is input into the microcontroller 135. Microcontroller 135 can control the information taken from the A/D converter 130 and can output this information to a modem 140. The modem 140 transmits data to any desired data processing equipment.

As can be further seen from FIG. 1, the microcontroller 135 is further connected with position sensors 155 that are used to detect the position of the filter wheel 92.

The optical pathway described above forms an optical spectral system in the present invention, which will now be described in more detail.

FIG. 2 is a simplified constructional illustration of the optical spectral system.

The optical diffuser 30 is surrounded by the occulting ring 27 and mounted at the window of a housing 64. The housing 64 may be any suitable appropriate housing employed as part of the spectral radiometer according to this invention. The optical path extends through the window in housing 64, after having gone through the diffuser 30 and the occulting ring 27, to the filter, illustrated as filter wheel 92 having a filter 320 thereon.

Further along the optical path, the collimator 95 is illustrated as having two apertures 96. The optical path extends through the apertures 96. A third aperture 78 is provided further along the optical path as part of the collimator 95. The third aperture has an aperture diameter smaller than the two apertures 96. The two apertures 96 preferably have the same nominal aperture diameter. The photomultiplier tube 59 (a photocathode) is located along the optical path below the aperture 78.

The relative positions of the three apertures 96, 78 are important in establishing a correct cosine response when using such apertures for the collimating arrangement. They are also important in constraining the angle of light that passes through the filter or filters to the detector. The use of apertures as part of a collimating arrangement is generally preferred, but the collimating arrangement could also comprise lenses. However, apertures involve less loss of light than with the use of lenses.

Figure 4A:
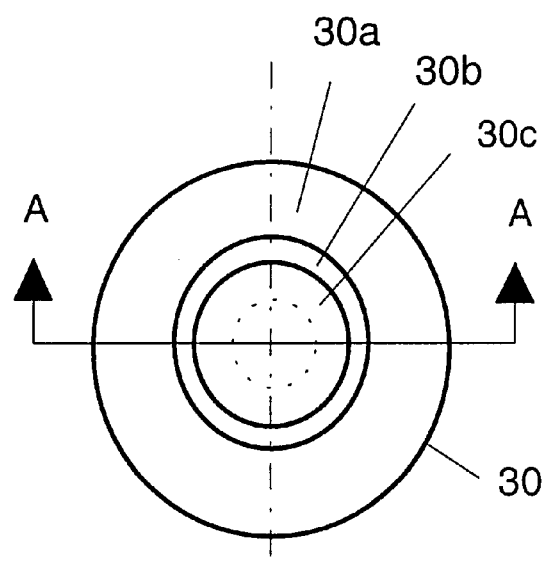
FIG. 4a is a top view of a diffuser according to the present invention.
Figure 4B:
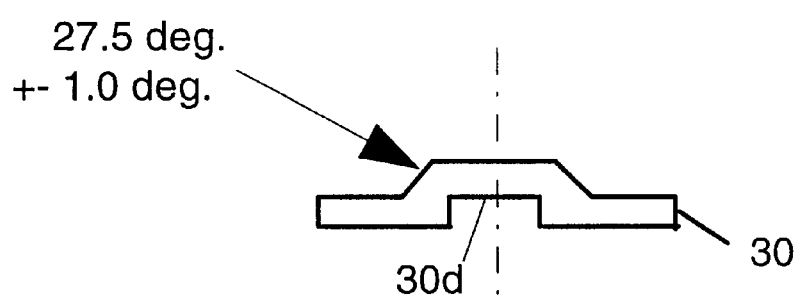

The diffuser 30 according to the present invention is more particularly shown in drawing FIGS. 4a and 4b. As discussed above, the material used for the diffuser 30 is Teflon™. In accordance with the preferred embodiment of the present invention, the diffuser has an upper light incidence surface composed of an outer annular surface area 30a that is flat and extends over a substantial portion of the diffuser as a whole. An inner circumference of the annular portion 30a is connected with a beveled portion 30b that is angled upwardly at 27.5° to an inner surface area 30c. The inner surface area 30c is a raised area centrally located on the diffuser 30.

A lower output surface of the diffuser 30 is flat, but has a central recess 30d extending into the diffuser.

The diffuser according to the present invention thus provides a combination of a raised center, having a 27.5° bevel, and a depression or recess in the bottom of the diffuser 30. By thus shaping the upper and lower surfaces of the diffuser 30, the diffuser 30 helps the spectral radiometer as a whole to achieve the correct cosine response.

Figure 5A:
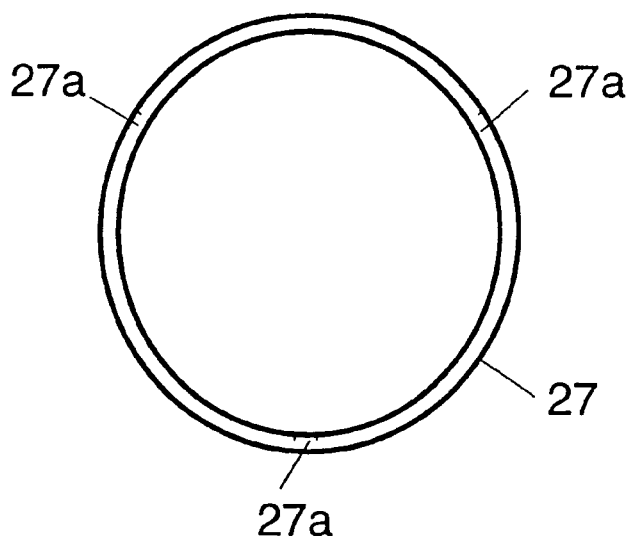
FIG. 5a is a plan view of an occulting ring for the diffuser.
Figure 5B:
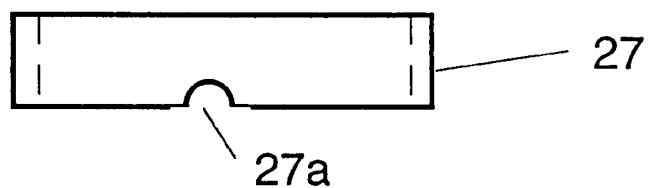

FIGS. 5a and 5b illustrate the occulting ring 27 according to the present invention. The main purpose of the occulting ring 27 is to ensure that the response of the instrument is 0 at a 90° zenith angle. The ring also affects the instrument response at zenith angles smaller than 90°. This effect is strongly driven by the height of the ring.

As can be seen from the figures, the ring is relatively thin, and has an inner diameter approximately twice the diameter of the diffuser 30. Thus, with an appropriately chosen height of the occulting ring 27, the cosine response of the instrument as a whole at source zenith angles between 70° and 90° will more closely follow the desired response.

Note the existence of notches 27a at the bottom portion of the occulting ring 27. These notches are provided to allow rainwater to flow out from inside of the ring 27 in its mounted position on the outside of the radiometer housing 64.

Figure 6A:
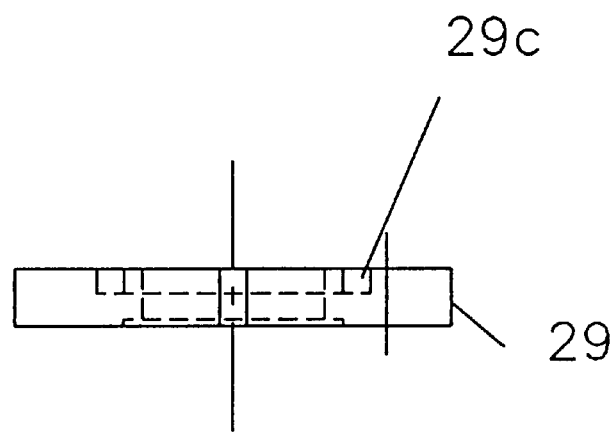
FIG. 6a is a side view of a diffuser holder for the diffuser according to the cosine corrected spectral radiometer of the present invention.
Figure 6B:
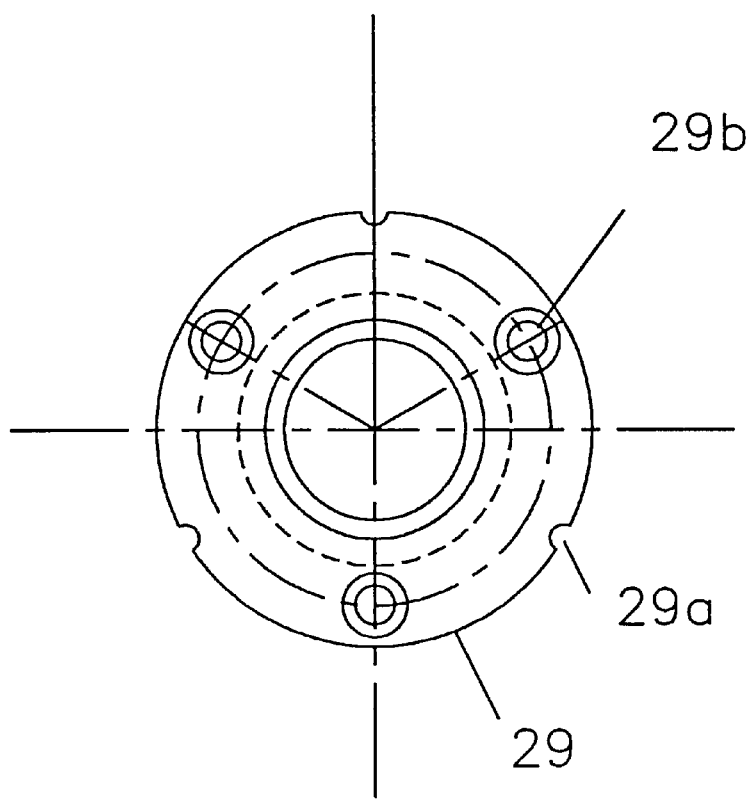

FIGS. 6a and 6b illustrate a diffuser holder 29 used to hold the diffuser 30. As can be seen, the diffuser 30 is mounted in an upper recess 29c of the diffuser 29, sized to suitably accommodate the diffuser 30. Three counterbores 29b are drilled at three places 120° apart in order to provide bolt head recesses. Bolt holes extend completely through, as seen in FIG. 6a. The diffuser holder has dimensions as to fit exactly within the occulting ring 27. The holder is preferably formed of aluminum.

Corresponding notches 29a are provided for draining water, which notches in use are aligned in position with the notches of the occulting ring 27. The sizes of the bolts in the respective holes in counterbores therefore are chosen so as to allow slight movement in the horizontal plane in order to precisely align the diffuser with the other optical components upon affixing the diffuser, for example to the housing 64.

Figure 7:
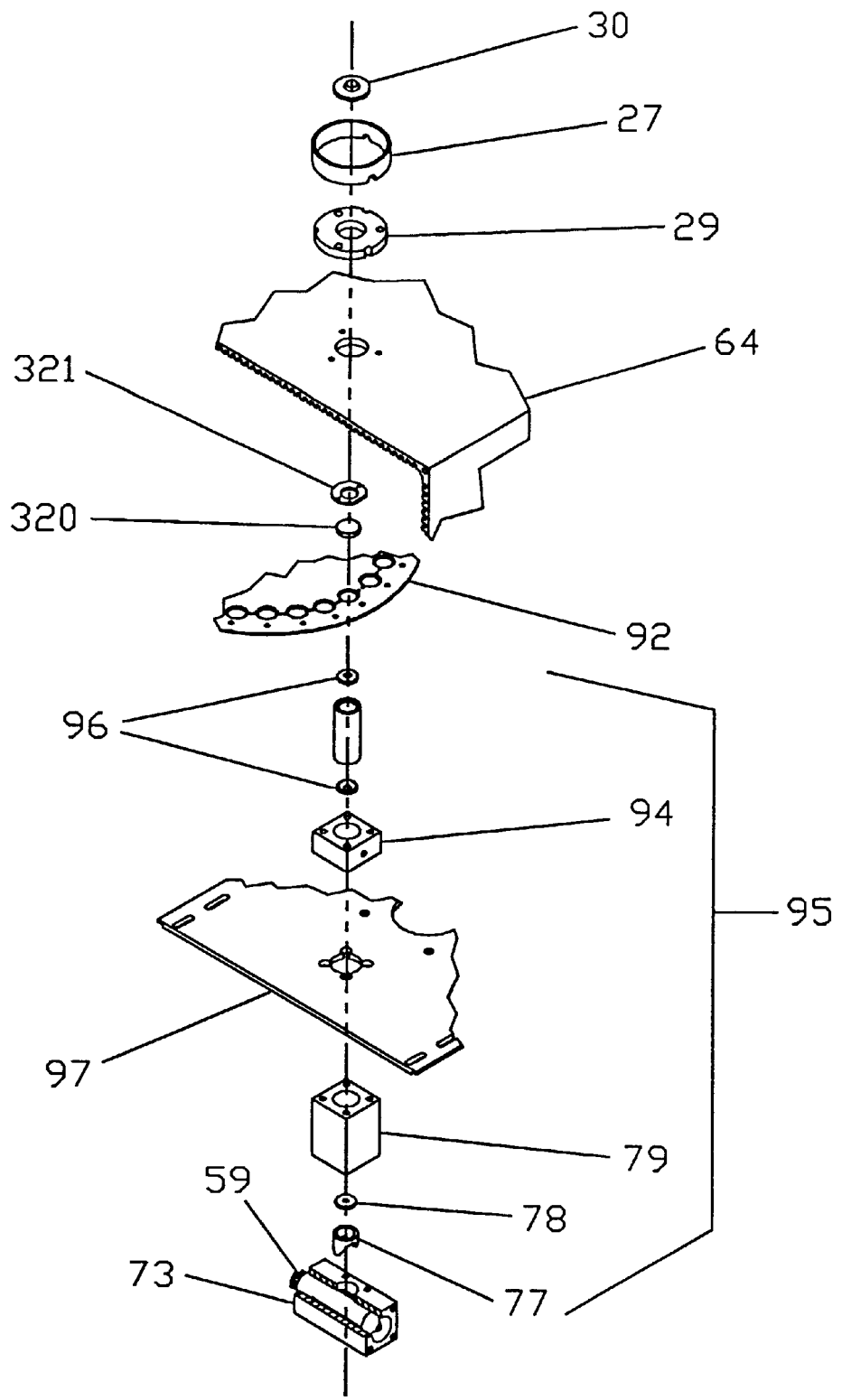
FIG. 7 is an exploded perspective view of an assembly of components, some partly illustrated, for the optical pathway of the cosine corrected spectral radiometer according to the present invention.

FIG. 7 is an exploded view of various components of the optical spectral system of the present invention disposed along the optical path. A photomultiplier tube holder 73 holds the photomultiplier tube 59. An aperture holder 77 holds the aperture 78 of the collimator 95. A mounting block 79 mounts the aperture holder 77. This block 79 is connected with an upper optical path mounting component 97, such as a board. The collimating arrangement having the apertures 96 is inserted into the block 79 as well as another block 94, all of which are supported by the board 97.

The diffuser 30 is mounted on the diffuser hold 29 inside the occulting ring 27. These can be mounted on the housing 64.

The filter wheel 92 is here shown between the diffuser and the collimator 95. It could instead be positioned between the collimator 95 and the photomultiplier tube 59.

In appropriately arranging the components of the present invention, their relative position is important though not their absolute position. A working example of how these components can be arranged relative to each other to obtain an appropriate cosine corrected response is discussed below.

Exemplary Arrangement

An exemplary working arrangement provides the two apertures 96 with nominal aperture diameters of 0.185 inches. The third aperture 78 has a nominal aperture diameter of 0.125 inches.

The diffuser 30 has an overall diameter of 0.750 inches. The raised area 30c, or elevated contour, near the middle of the diffuser 30 has a specific diameter of 0.350 inches. The overall thickness of the diffuser 30 is 0.1275 inches, and the thickness of the outer annular portion 30a is 0.0625 inches. The lower output surface of the diffuser 30 has the central recess 30d dimensioned with a diameter of 0.250 inches.

The central portion 30c thus has a height of 0.0650 inches above the outer annular portion 30a.

The occulting ring 27 has a height of 0.380 inches. The diffuser holder 29 is provided with an upper recess 29c having a diameter of 0.755 inches. The diffuser holder 29, furthermore, has an overall height of 0.200 inches, and the recess 29c has a depth of 0.024 inches for receiving the diffuser 30. The window below the diffuser 30 has a diameter of 0.625 inches.

The three counterbores 29b each have a diameter of 0.250 inches, drilled 0.110 inches deep at the three places spaced 120° apart. The diffuser holder has a diameter overall of 1.500 inches so as to fit exactly within the occulting ring 27.

With the above dimensions, the bottom of the diffuser is spaced along the optical path from the first aperture 96 a distance of 1.7535 inches. From the first aperture 96 to the second aperture 96, toward the photomultiplier tube 59, the spacing along the optical path is 1.1925 inches. (It is noted that all of the apertures have a knife edge, and that their respective dimensions are to that edge.)

From the second aperture 96 to the aperture 78, the spacing along the optical path is 0.5155 inches. From the aperture 78 to the envelope of the photomultiplier tube 59, the spacing is 0.1200 inches. The "envelope" of the photomultiplier tube 59 means the outer surface of the photomultiplier tube window.

Thus, the above dimensions provide one working example of the arrangement according to the optical pathway of the present invention. It is of course to be noted that it is the relative spacing that is important, and not the absolute spacing. It should be further noted that variations will occur to those of ordinary skill in the art, and may thus require variations in such relative spacings. For example, one of ordinary skill in the art might use a lens system instead of the apertures of the collimator 95.

Operation

In operation, light is received by the diffuser 30 and passed therethrough. The light travels along the optical pathway through the filters of the filter wheel 92 and through the collimator 95. Thus, only light that has been made parallel continues. The collimated light subsequently is picked up by the photomultiplier tube 59 acting as a photodetector. A current to voltage converter converts the detected current into a voltage. The analog to digital converter converts the voltage into a digital signal which can be processed with the microcontroller, together with the information concerning the position sensors of the filter wheel. Thus, by choosing an appropriate filter for a particular band pass, such as UVB, the amount of incoming light can be periodically detected, and this information stored. The arrangement of the optical pathway ensures that the detected information has been cosine corrected.

Noting for example FIG. 8, the ideal cosine response is represented by the "+" and the instrument response as represented by a rectangle. The instrument cosine response is thus compared with actual cosine response in a graph of the response vs. the zenith angle. This figure thus shows the relationship of the zenith angle of light from the point source such as the sun falling on a horizontal surface detector, and the response of the radiometer incorporating the optical spectral system according to the present invention. As has been discussed, the intent of the present invention is to have the radiometer response duplicate the response of the normal flat plate collector with respect to the light incident angle, which follows the cosine of the zenith angle.

FIG. 9 is a graph showing measured response of a radiometer incorporating the optical spectral system according to the present invention normalized with respect to a true cosine response, which is set to 1.0 in this plot. As can be seen, the instrument responds very well between −70 and +70°, which is where most of the natural sun and sky light comes from when monitoring the outdoors.

As can be seen from this graph, response is within 3% of true cosine response for a zenith angle in a range of −70° to +70°. Further, the response is within 20% of true cosine response for a zenith angle range of −80° to +80°. The present invention can provide these results for UVB radiation, which has been particularly difficult with the prior art. Thus, the present invention can provide a narrow band width in combination with cosine correction. As can be seen from FIG. 8, the average accuracy is about 1% in terms of correcting the cosine response.

In accordance with the present invention, a band pass filter is employed for wave length specificity. A photodetector is used that can maintain a sufficient response for that narrow band width. As discussed above, a photomultiplier tube may be used, chosen with respect to a narrow band width, for example for UVB measurement.

As has also been discussed above, the collimating arrangement could be as discussed above, but could also have its function carried out with a lens system. However, more loss could be expected with a lens system. It is further noted that the third or last aperture (78), that closest to photomultiplier tube or photodetector and having a smaller diameter, creates a spot of light for the photomultiplier tube, which fact is helpful in obtaining the proper cosine response.

It is further noted that for UVB, a solar blind photomultiplier tube is preferably used. However, other types of photodetectors might be contemplated, such as a silicon detector.

The collimating arrangement is an important aspect of the present invention, because it is only light that is parallel that has the proper band pass characteristics and wavelength specificity. On the other hand, the location of the filter is less critical. The filter could be a single filter, or a filter wheel for purposes of scanning. However, it could be located on either side of the collimating arrangement; i.e. between the collimating arrangement and the diffuser, as shown, or between the collimating arrangement and the detector. Thus, in accordance with the present invention, an optical system has been provided that enables overall accurate light detection in a UVB spectral radiometer. The optical spectral system corrects the cosine response to incident light through the design of the optical elements. A number of separate factors are important in correcting the cosine response, as discussed above. These include the relative position of the optical components, the shape and size of the diffuser, and the placement and size of the three optical apertures in the collimating arrangement. An occulting ring is also important in ensuring that the instrument signal will be zero at a source zenith angle of 90°.

Thus the diffuser according to the present invention is provided with upper and lower shaped surfaces corresponding to a source directed side and a sensor directed side of the diffuser. In the optical pathway, the shaped surfaces are predetermined so that the diffuser functions properly, given the characteristics of the optical pathway, including the occulting ring, the collimator and the photodetector. The collimator has a predetermined spacing from the lower surface or sensor directed surface of the diffuser so as to maximize the cosine correction effect of the optical pathway as a whole. The same is true for the components of the collimator itself, whether using the apertures 96 and 78, or a different kind of system, such as a lens system. Furthermore, a predetermined spacing is established from the exit point of the collimator to the photodetector so as to similarly maximize the cosine correction effect. Thus, in using the term "predetermined", whether in reference to spacings between the components, or the shaped surfaces, the term means that the surfaces or spacings have been chosen in consideration of the other components of the system affecting cosine correction. In this manner, cosine correction can be maximized, particularly with respect to UVB light.

Thus while specific details of the present invention have been set forth above, it should be noted that such details are exemplary of the present embodiment, and are not to be taken in a limiting sense. Variations will be apparent to those of ordinary skill in the art, and such variation should be considered within the scope of the present invention as defined by the appended claims.

We claim:

1. A radiometer having a cosine corrected optical pathway, comprising:

a diffuser having predetermined upper and lower shaped surfaces;

an occulting ring laterally surrounding said diffuser;

a light filter below said diffuser;

a photodetector positioned below said filter so as to receive filtered radiation, wherein an optical path extends from said diffuser to said photodetector and wherein said filter is positioned along said optical path between said photodetector and said diffuser such that light received by said diffuser passes through said filter; and a collimating arrangement spaced a predetermined distance from and between each of said diffuser and said photodetector, said optical path extending through said collimating arrangement, wherein said collimating arrangement comprises a collimator tube.

2. The radiometer of claim 1, wherein said collimator tube comprises three apertures, two first apertures spaced from each other and having the same nominal aperture diameter and a second aperture having a smaller nominal aperture diameter, wherein said second aperture is located between said first apertures and said photodetector along said optical path.

3. The radiometer of claim 2, wherein said photodetector comprises a photomultiplier tube.

4. A radiometer having a cosine corrected optical pathway, comprising:

a diffuser having predetermined upper and lower shaped surfaces;

an occulting ring laterally surrounding said diffuser;

a light filter below said diffuser;

a photodetector positioned below said filter so as to receive filtered radiation, wherein an optical path extends from said diffuser to said photodetector and wherein said filter is positioned along said optical path between said photodetector and said diffuser such that light received by said diffuser passes through said filter; and a collimating arrangement spaced a predetermined distance from and between each of said diffuser and said photodetector, said optical path extending through said collimating arrangement, wherein said filter is a band pass filter, and said diffuser, occulting ring, and collimating arrangement are arranged along said optical path so as to provide an instrument cosine response that is within 3% of true cosine response for a zenith angle range of −70 degrees to +70 degrees.

5. A radiometer having a cosine corrected optical pathway, comprising:

a diffuser having predetermined upper and lower shaped surfaces;

an occulting ring laterally surrounding said diffuser;

a light filter below said diffuser;

a photodetector positioned below said filter so as to receive filtered radiation, wherein an optical path extends from said diffuser to said photodetector and wherein said filter is positioned along said optical path between said photodetector and said diffuser such that light received by said diffuser passes through said filter; and a collimating arrangement spaced a predetermined distance from and between each of said diffuser and said photodetector, said optical path extending through said collimating arrangement;

wherein said filter is a band pass filter, and said diffuser, occulting ring, and collimating arrangement are arranged along said optical path so as to provide an instrument cosine response that is within 20% of true cosine response for a zenith angle range of −80 degrees to +80 degrees.

6. A radiometer having a cosine corrected optical pathway, comprising:
- a diffuser having predetermined upper and lower shaped surfaces;
- an occulting ring laterally surrounding said diffuser;
- a light filter below said diffuser;
- a photodetector positioned below said filter so as to receive filtered radiation,
- wherein an optical path extends from said diffuser to said photodetector and wherein said filter is positioned along said optical path between said photodetector and said diffuser such that light received by said diffuser passes through said filter; and
- a collimating arrangement spaced a predetermined distance from and between each of said diffuser and said photodetector, said optical path extending through said collimating arrangement;
- wherein said upper shared surface of said diffuser comprises an outer annular surface portion, an inner surface portion, and an annular bevel surface extending radially inwardly and axially upwardly from an inner circumference of said outer annular surface portion to said inner surface portion, and wherein said lower shaped surface comprises an outer annular portion and an inner recess portion defining a recess that extends axially upwardly relative to said outer annular portion; and
- wherein said inner surface portion has a diameter that is less than half of the diameter of said diffuser as a whole and wherein said recess has a diameter that is one half of the diameter of the diffuser as a whole and an axial extent less than half of the axial extent of said diffuser as a whole.

7. The radiometer of claim 6, wherein said bevel surface extends at an angle of 27.5 degrees relative to said outer annular surface.

8. A radiometer having a cosine corrected optical pathway, comprising:
- a diffuser having predetermined upper and lower shaped surfaces;
- an occulting ring laterally surrounding said diffuser;
- a light filter below said diffuser;
- a photodetector positioned below said filter so as to receive filtered radiation,
- wherein an optical path extends from said diffuser to said photodetector and wherein said filter is positioned along said optical path between said photodetector and said diffuser such that light received by said diffuser passes through said filter; and
- a collimating arrangement spaced a predetermined distance from and between each of said diffuser and said photodetector, said optical path extending through said collimating arrangement;
- wherein said occulting ring extends upwardly in a direction of said optical path beyond said upper incident surface of said diffuser; and
- wherein said occulting ring comprises a black annular wall member having an inner diameter twice that of said diffuser.

9. A radiometer having a cosine corrected optical pathway, comprising:
- a diffuser having predetermined upper and lower shaped surfaces;
- an occulting ring laterally surrounding said diffuser;
- a light filter below said diffuser;
- a photodetector positioned below said filter so as to receive filtered radiation,
- wherein an optical path extends from said diffuser to said photodetector and wherein said filter is positioned along said optical path between said photodetector and said diffuser such that light received by said diffuser passes through said filter; and
- a collimating arrangement spaced a predetermined distance from and between each of said diffuser and said photodetector, said optical path extending through said collimating arrangement;
- wherein said upper shaped surface of said diffuser comprises an outer annular surface portion, an inner surface portion, and an annular bevel surface extending radially inwardly and axially upwardly from an inner circumference of said outer annular surface portion to said inner surface portion, and wherein said lower shaped surface comprises an outer annular portion and an inner recess portion defining a recess that extends axially upwardly relative to said outer annular portion;
- wherein said collimating arrangement comprises a tube which comprises three apertures, two first apertures spaced from each other and having the same nominal aperture diameter and a second aperture having a smaller nominal aperture diameter, wherein said second aperture is located between said first apertures and said photodetector along said optical path;
- wherein said occulting ring extends upwardly in a direction of said optical path beyond said upper incident surface of said diffuser; and
- wherein said photodetector comprises a photomultiplier tube comprising a photocathode having an active area and a magnetic shield therearound forming a slit over said active area, said slit being positioned along said optical path.

10. A cosine corrected optical pathway for a radiometer, comprising:
- a diffuser having a predetermined upper shared surface and a predetermined lower shaped surface;
- an occulting ring laterally surrounding said diffuser;
- a light filter;
- a photodetector positioned at one end of an optical path and said diffuser positioned at another end of said optical path, wherein said filter is positioned along said optical path between said photodetector and said diffuser such that light collected by said diffuser travels along said optical path through said filter; and
- a collimating arrangement spaced a predetermined distance from and between each of said diffuser and said photodetector, said optical path extending through said collimating arrangement, wherein said collimating arrangement comprises a collimator tube.

11. The optical pathway of claim 10, wherein said collimator tube comprises three apertures, two first apertures spaced from each other and having the same nominal aperture diameter and a second aperture having a smaller nominal aperture diameter, wherein said second aperture is located between said first apertures and said photodetector along said optical path.

12. The optical pathway of claim 11, wherein said photodetector comprises a photomultiplier tube.

13. A cosine corrected optical pathway for a radiometer, comprising:

a diffuser having a predetermined upper shaped surface and a predetermined lower shaped surface;

an occulting ring laterally surrounding said diffuser;

a light filter;

a photodetector positioned at one end of an optical path and said diffuser positioned at another end of said optical path, wherein said filter is positioned alone said optical path between said photodetector and said diffuser such that light collected by said diffuser travels along said optical path through said filter; and a collimating arrangement spaced a predetermined distance from and between each of said diffuser and said photodetector, said optical path extending through said collimating arrangement;

wherein said filter is a band pass filter, and said diffuser, occulting ring, and collimating arrangement are arranged along said optical path so as to provide an instrument cosine response that is within 3% of true cosine response for a zenith angle range of −70 degrees to +70 degrees.

14. A cosine corrected optical pathway for a radiometer, comprising:

a diffuser having a predetermined upper shaped surface and a predetermined lower shaped surface;

an occulting ring laterally surrounding said diffuser;

a light filter;

a photodetector positioned at one end of an optical path and said diffuser positioned at another end of said optical path, wherein said filter is positioned alone said optical path between said photodetector and said diffuser such that light collected by said diffuser travels along said optical path through said filter; and a collimating arrangement spaced a predetermined distance from and between each of said diffuser and said photodetector, said optical path extending through said collimating arrangement;

wherein said filter is a band pass filter, and said diffuser, occulting ring, and collimating arrangement are arranged along said optical path so as to provide an instrument cosine response that is within 20% of true cosine response for a zenith angle range of −80 degrees to +80 degrees.

15. A cosine corrected optical pathway for a radiometer, comprising:

a diffuser having a predetermined upper shaped surface and a predetermined lower shaped surface;

an occulting ring laterally surrounding said diffuser;

a light filter;

a photodetector positioned at one end of an optical path and said diffuser positioned at another end of said optical path, wherein said filter is positioned alone said optical path between said photodetector and said diffuser such that light collected by said diffuser travels along said optical path through said filter; and a collimating arrangement spaced a predetermined distance from and between each of said diffuser and said photodetector, said optical path extending through said collimating arrangement;

wherein said upper shaped surface of said diffuser comprises an outer annular surface portion, an inner surface portion, and an annular bevel surface extending radially inwardly and axially upwardly from an inner circumference of said outer annular surface portion to said inner surface portion, and wherein said lower shaped surface comprises an outer annular portion and an inner recess portion defining a recess that extends axially upwardly relative to said outer annular portion;

wherein said inner surface portion has a diameter that is less than half of the diameter of said diffuser as a whole and wherein said recess has a diameter that is one half of the diameter of the diffuser as a whole and an axial extent less than half of the axial extent of said diffuser as a whole.

16. The optical pathway of claim 15, wherein said bevel surface extends at an angle of 27.5 degrees relative to said outer annular surface.

17. A cosine corrected optical pathway for a radiometer, comprising:

a diffuser having a predetermined upper shaped surface and a predetermined lower shaped surface;

an occulting ring laterally surrounding said diffuser;

a light filter;

a photodetector positioned at one end of an optical path and said diffuser positioned at another end of said optical path, wherein said filter is positioned alone said optical path between said photodetector and said diffuser such that light collected by said diffuser travels along said optical path through said filter; and a collimating arrangement spaced a predetermined distance from and between each of said diffuser and said photodetector, said optical path extending through said collimating arrangement;

wherein said occulting ring extends upwardly in a direction of said optical path beyond said upper incident surface of said diffuser; and wherein said occulting ring comprises a black annular wall member having an inner diameter twice that of said diffuser.

18. A cosine corrected optical pathway for a radiometer, comprising:

a diffuser having a predetermined upper shaped surface and a predetermined lower shaped surface;

an occulting ring laterally surrounding said diffuser;

a light filter;

a photodetector positioned at one end of an optical path and said diffuser positioned at another end of said optical path, wherein said filter is positioned along said optical path between said photodetector and said diffuser such that light collected by said diffuser travels along said optical path through said filter; and a collimating arrangement spaced a predetermined distance from and between each of said diffuser and said photodetector, said optical path extending through said collimating arrangement wherein said upper shaped surface of said diffuser comprises an outer annular surface portion, an inner surface portion, and an annular bevel surface extending radially inwardly and axially upwardly from an inner circumference of said outer annular surface portion to said inner surface portion, and wherein said lower shaped surface comprises an outer annular portion and an inner recess portion defining a recess that extends axially upwardly relative to said outer annular portion;

wherein said collimating arrangement comprises a tube which comprises three apertures, two first apertures spaced from each other and having the same nominal aperture diameter and a second aperture having a smaller nominal aperture diameter, wherein said second aperture is located between said first apertures and said photodetector along said optical path;

wherein said occulting ring extends upwardly in a direction of said optical path beyond said upper shaped surface of said diffuser; and wherein said photodetector comprises a photomultiplier tube comprising a photocathode having an active area and a magnetic shield therearound forming a slit over said active area, said slit being positioned along said optical path.

* * * * *